US008896281B2

(12) United States Patent
Wrathall

(10) Patent No.: US 8,896,281 B2
(45) Date of Patent: Nov. 25, 2014

(54) METHOD FOR GENERATING AN INTERNAL COMPENSATION NETWORK OF A POLE AND TWO ZEROS TO COMPENSATE HIGH FREQUENCY VOLTAGE MODE SWITCHING REGULATORS

(75) Inventor: Robert Wrathall, Scotts Valley, CA (US)

(73) Assignee: Advanced Analogic Technologies Incorporated, Santa Clara, CA (US)

( * ) Notice: Subject to any disclaimer, the term of this patent is extended or adjusted under 35 U.S.C. 154(b) by 512 days.

(21) Appl. No.: 12/032,211

(22) Filed: Feb. 15, 2008

(65) Prior Publication Data
US 2009/0206808 A1 Aug. 20, 2009

(51) Int. Cl.
G05F 1/00 (2006.01)
H02M 3/158 (2006.01)

(52) U.S. Cl.
CPC .......... H02M 3/1588 (2013.01); Y02B 70/1466 (2013.01)
USPC .......................................... 323/282; 323/284

(58) Field of Classification Search
USPC ................................. 323/282–285
See application file for complete search history.

(56) References Cited

U.S. PATENT DOCUMENTS

| 6,366,070 B1* | 4/2002 | Cooke et al. | 323/284 |
| 6,583,609 B1* | 6/2003 | Pardoen | 323/284 |
| 7,170,264 B1* | 1/2007 | Galinski | 323/284 |
| 2004/0021518 A1* | 2/2004 | Wrathall | 330/253 |
| 2006/0022658 A1* | 2/2006 | Harriman et al. | 323/284 |

OTHER PUBLICATIONS

R. Ridley, Analyzing the Sepic Converter, Nov. 2006, Power Systems Design Europe, p. 14, 16, 18.*

* cited by examiner

Primary Examiner — Jue Zhang
(74) Attorney, Agent, or Firm — Lando & Anastasi, LLP

(57) ABSTRACT

A method for controlling a switching voltage regulator that includes generating a feedback voltage that is proportional to the output voltage of the voltage regulator; generating a voltage proportional to the duty-cycle of the inductor charging and discharging phases as a function of the difference between the feedback voltage and a reference voltage; and adding a dominate pole and two zeros to the function used to generate the voltage proportional to the duty-cycle of the inductor charging and discharging phases.

20 Claims, 7 Drawing Sheets

METHOD FOR GENERATING AN INTERNAL COMPENSATION NETWORK OF A POLE AND TWO ZEROS TO COMPENSATE HIGH FREQUENCY VOLTAGE MODE SWITCHING REGULATORS

BACKGROUND OF THE INVENTION

A voltage regulator is a circuit that provides a precise output voltage under varying load conditions from an unknown and possibly varying input voltage. Many different types of voltage regulators have been developed, each with its own set of advantages. This particular application is directed at a particular class of voltage regulator known as inductor-based switching voltage regulators. The two most common types of inductor-based switching regulators are Boost (output voltage greater than input voltage) and Buck (output voltage less than input voltage) switching regulators. Both Boost and Buck switching regulators are very important for battery powered applications such as cellphones.

As shown in FIG. 1A, a traditional implementation for a Buck switching regulator includes a switch 102 connected between an input voltage (VP in this case) and a node 116. A switch 104 is connected between the node 116 and the ground voltage (VN). An inductor 106 is connected between the node 116 and the output node ($V_{OUT}$) of the regulator. A filtering capacitor connects $V_{OUT}$ to the ground voltage VN. The node $V_{OUT}$ is also connected to a load represented by the resistor 110.

A control circuit (described below) turns switches 102 and 104 ON and OFF in a repeating pattern. Switch 102 is driven out of phase with switch 104. Thus, when switch 102 is ON switch 104 is OFF. This causes the Buck switching regulator to have two distinct operational phases. In the first phase, shown in FIG. 1B, the switch 102 is ON. During this phase, called the charging phase the inductor 106 is connected between the battery and the output node $V_{OUT}$. This causes current to flow from the battery to the load. In the process energy is stored in the inductor 106 in the form of a magnetic field. In the second, or discharge phase the switch 102 is opened (see FIG. 1C). In this phase, the inductor 106 is connected in series between ground and the load. Current supplied by the inductor's collapsing magnetic field flows to the output node $V_{OUT}$ and the load.

As shown in FIG. 1D, a typical Boost converter includes all of the components just described. A slightly different topology is used in which the switch 102 is placed between the inductor 106 and the output node. The Boost converter uses a similar two phase pattern of switching for its two switches.

SEPIC converters are another type of inductor-based switching regulators. SEPIC converters are more fully described in a copending U.S. patent application Ser. No. 11/933,402 entitled "High Voltage SEPIC Converter," now U.S. Pat. No. 8,350,546. That disclosure is incorporated in this document by reference.

To maintain its output at a constant voltage, switching regulators include control circuits that modulate the duty factor of their high and low-side switches 102 and 104, respectively. As shown in FIG. 1A, the control circuit typically includes a resistive divider formed by resistors 112 and 114 as well as an error amplifier 118, comparator 120 and break-before-make (BBM) circuit 112. The resistive divider generates a feedback voltage FB proportional to the output of the regulator. The feedback voltage FB is one of the inputs to the error amplifier 118. The second error amplifier 118 input is a reference voltage BG that is generated using any convenient technique as is well known in the relevant art. The error amplifier 118 compares the feedback voltage FB to the reference voltage BG and multiplies the difference by a gain factor to generate an output voltage EAOUT.

The error amplifier 118 output EAOUT is one of the inputs to the comparator 120. The second input to the comparator 120 is a periodic ramp voltage RAMP. The output of the comparator 120 (i.e., the comparison between the ramp voltage RAMP and the output of the error amplifier EAOUT) is a periodic square wave signal CLKV. The square wave signal CLKV is passed to the BBM circuit 122. The BBM circuit 122 generates a signal based on CLKV to drive the high-side switch 102 and a complementary signal to drive the low-side switch 104. In general, it takes a finite amount of time to turn the high and low-side switches 102 and 104, respectively, ON and OFF. For this reason, the act of turning a switch OFF is always done slightly in advance of the act of turning the other switch ON. This technique, known as break-before-make avoids the situation where both switches are ON at the same time and power is connected through the high and low-side switches to ground (a condition known as shoot through).

FIG. 1E shows the ramp voltage RAMP along with the error amplifier output 118 EAOUT. The corresponding comparator 120 output CLKV is also shown. As may be appreciated, the duty cycle of CLKV is defined by the intersection of RAMP and EAOUT. FIG. 1E also shows a higher error amplifier 118 output (labeled EAOUT') and the effect that it has on the duty cycle of the periodic square wave signal CLKV. This is the basic feedback mechanism for the Buck regulator of FIG. 1A: decreases in the output voltage cause the feedback voltage FB to fall. This causes the error amplifier 118 output EAOUT to increase. The increase in EAOUT causes CLKV to have an increased duty cycle. This increases the duty cycle of the high-side switch 102 and decreases the duty cycle of the low-side switch 104. Thus, if the output voltage increases or decreases, the duty cycle of the high and low-side switches are adjusted in a way that compensates for the increased or decreased output.

The control loop just described is an example of what is generally referred to as voltage mode control (i.e., regulator output is regulated as a function of output voltage). In this control loop, the gain of the error amplifier determines the accuracy of regulation. A high gain amplifier keeps the deviations of the output voltage relatively small and close to ideal. A lower gain amplifier allows larger deviations to occur.

The control loop must maintain stability, that is to say, must not oscillate which would cause the output voltage to oscillate. Feedback theory provides criteria for this stability. If the gain of the control loop is plotted as a function of frequency, an element of the control loop must reduce the gain below one at some frequency. This frequency is called the gain-bandwidth (GBW) product or unity gain frequency.

A large GBW product control loop indicates that the control loop is fast and can respond to fast transients. For example, in modern microprocessors, the processor can turn on rapidly so that the supply current takes a large fast step in times approaching the switching speed of the microprocessor. A large GBW product allows the voltage regulator to respond quickly to such changes. (If the circuit does not have a large GBW product, then large output capacitors are needed to sustain the output voltage until the loop responds).

Control theory says that the phase shift around the control loop must not be greater than 180 degrees at the unity gain frequency. In fact, the circuit is not really useable if the phase shift of the control loop is near 180 degrees. It is preferable to be near 90 degrees, but in many cases 140 to 130 degrees of phase shift is acceptable.

In a voltage mode converter, the inductor—capacitor pair introduce a 180 degree phase shift by themselves at their resonant frequency: $1/2\pi*(L*C)^{1/2}$. As a result, any control loop must take this into account by removing about 90 degrees of phase shift starting at the resonant frequency.

In the parlance of control loop theory, the removal of 90 degrees of phase shift is accomplished by adding a "zero" to the control loop. If 90 degrees of phase shift is added, a "pole" is added to the control loop. The LC filter of the buck converter adds a "double pole" at the resonant frequency, to get the 180 degree phase shift.

If nothing were done except adding a wide band amplifier for control, the voltage mode converter would be unstable because of the double pole adding 180 degrees of phase shift at the unity gain frequency. For good compensation a zero must be added at the resonant frequency of the output filter to add back 90 degrees of phase shift.

In the prior art, voltage mode compensation has been generally accomplished three ways as shown in FIG. 2. The first way is placing capacitor 202 in the feedback loop. This adds a zero and a pole which are generally too close together in frequency for most cases we want to consider. This makes this technique helpful but not very useful.

Another prior art is using the parasitic resistance 204 of the filter capacitor 108 as the zero forming element. For a 20 uf filter capacitor 108, and a 30 kHz zero, this yields a parasitic resistance 204 value of 0.26 ohms which is large (for most cases) and may produce large ripple. To get to a reasonable ESR, large values of capacitance must be used, but still the ripple is a problem. Generally tantalum or other electrolytic capacitors are needed for this type of compensation. Ceramic capacitors, in general, have too low an ESR to be effective. Tantalum capacitors are generally more expensive than ceramic.

In FIG. 2 a box is shown connecting the error amplifier 118 output to the feedback node. This feedback network might be used to create a three pole, two zero circuit which can be effective to stabilize the voltage mode circuit. The resultant gain transfer curve is shown in FIG. 3. A dominant pole is introduced at about 30 Hz. At about 20 k Hz a double zero is introduced, just below the resonance of the LC circuit. At about the switching frequency of the regulator, about 1 MHz, another double pole is introduced which rolls the gain off to the unity gain point above 10 MHz.

The error amplifier 118 output and FB nodes are brought to an external compensation network 206 where a dominant pole and two zeros are introduced. In order to make the system stable, a double pole must be introduced at a high frequency to roll the gain off to make the system stable. In this example, the gain bandwidth product is near 50 MHz for the amplifier. It can also be seen that the second zero's effectiveness is less than a decade. If the GBW product of the amplifier is reduced, the whole curve must be shifted to a lower frequency, which makes the regulator slower and uses larger external components.

A third compensation scheme places a low pole in the compensation network 206 such that the unity gain is reached well before the double pole of the output filter. This makes a very slow control loop.

SUMMARY OF THE INVENTION

This disclosure describes an internal compensation network and associated compensation method for inductor-based switching regulators (see FIG. 4). The compensation network adds a pole and two zeros to compensate high-frequency voltage mode operation. An example of an inductor-based switching regulator that uses the compensation network 402 includes a high-side switch 410 connected between an input supply (VP) and a node 424. The node 424 is connected to a ground voltage (VN) by a low-side switch 412. An inductor 414 connects the node 424 to an output node. The output node is further connected to the ground voltage VN by an output or filter capacitor 416. A load 418 is connected between the output node and the ground voltage VN in parallel with the output capacitor 416.

A control circuit is used to drive the high and low-side switches 410 and 412, respectively, in a repeating sequence that includes an inductor charging phase and an inductor discharging phase. During the inductor charging phase, the control switch activates the high-side switch 410 to connect the node 424 to the input voltage VP. This causes current to flow from the input supply, through the inductor 414 to the load 418. During the inductor discharging phase, the control switch activates the low-side switch 412 (and deactivates the high-side switch 410). This connects the node 424 to the ground voltage VN. Current continues to flow to the load 418 as the magnetic field of the inductor 414 collapses. The control circuit modulates the duty cycle of the high and low-side switches 410 and 412, respectively, (i.e., the relative duration of activation of the high and low-side switches) to regulate the voltage at the output node.

To perform the required modulation, the control circuit uses a resistive divider to generate a feedback voltage FB that is proportional to the voltage difference between the output node and the ground voltage VN.

Referring to FIG. 8B, the feedback voltage FB is passed, via a resistor 820 to the positive input of an error amplifier 408. A node 814 located between the resistor 820 and the error amplifier 408 is connected via a filter capacitor 826 to the ground voltage VN. A reference voltage BG is passed, via a resistor 426 to the negative input of the error amplifier 408. A node 816 located between the resistor 426 and the error amplifier 408 is connected via a filter capacitor 828 to the ground voltage VN. A compensation network is connected between the node 816 and the output of the error amplifier 408.

Within the compensation network, a series connection of a capacitor 802 and a resistor 804 connect the node 816 to an internal node 810. The node 810 is connected, by a series connection of the resistor 812 and the capacitor 806 to the ground voltage VN.

A resistor 808 connects the node 810 to an internal node 818. The node 818 is connected by a second filter capacitor 830 to the ground voltage VN. The node 818 is connected via a resistor 822 to the output of the error amplifier. The node 818 is also connected by a resistor 824 to the output node EAOUT of the compensation network.

Referring back to FIG. 4, the output node EAOUT is connected an input of a comparator 404. The second input to the comparator 404 is a periodic ramp voltage RAMP. The output of the comparator 404 (i.e., the comparison between the ramp voltage and the output of the error amplifier EAOUT) is a periodic square wave signal CLKV. The square wave signal CLKV is passed to the BBM circuit 406. The BBM circuit generates a signal based on CLKV to drive the high-side switch 410 and a complementary signal to drive the low-side switch 412.

As the switching regulator operates, the error amplifier 408 generates a voltage proportional to the duty cycle of the high and low-side switches 410 and 412, respectively. The compensation network 402 adds a dominate pole and two zeros to the gain product of the error amplifier 408 to compensate high-frequency voltage mode operation.

DETAILED DESCRIPTION OF THE PREFERRED EMBODIMENTS

Figure 1A:
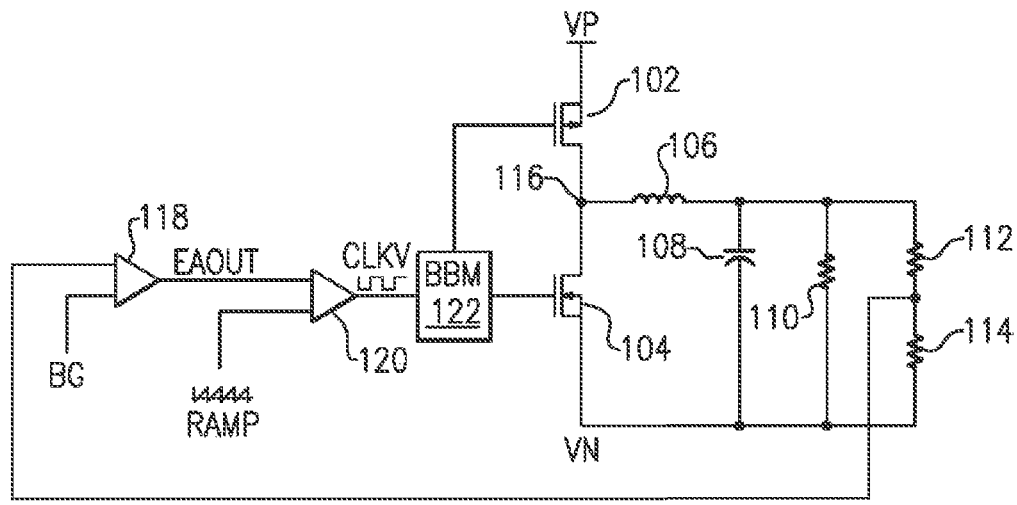
FIG. 1A is a block diagram of a prior art Buck switching regulator.
Figure 1B:
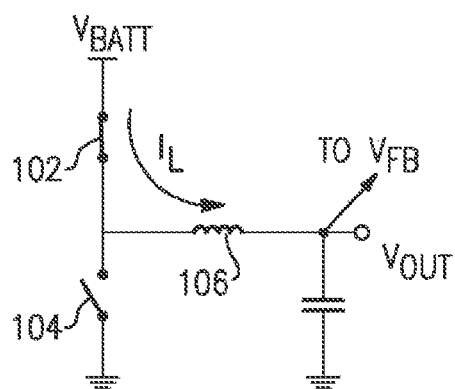
FIG. 1B is a block diagram showing the prior art Buck switching regulator of FIG. 1 during the charge phase of operation.
Figure 1C:
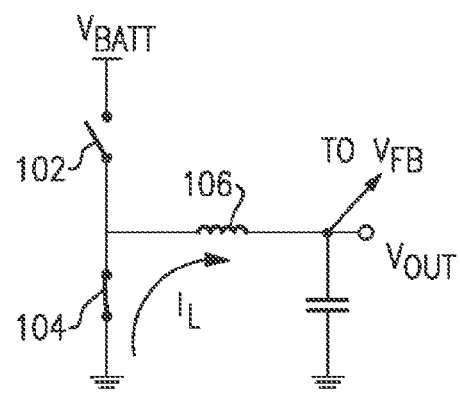
FIG. 1C is a block diagram showing the prior art Buck switching regulator of FIG. 1 during the discharge phase of operation.
Figure 1D:
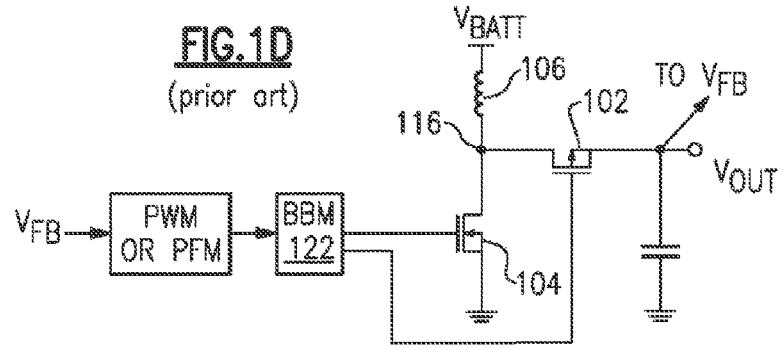
FIG. 1D is a block diagram of a prior art Boost switching regulator.
Figure 1E:
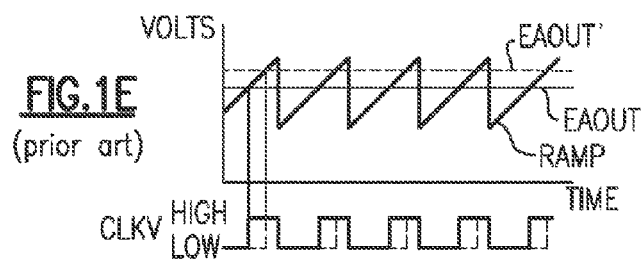
FIG. 1E is graph showing the feedback and ramp voltages used to control typical prior art switching regulators.
Figure 2:
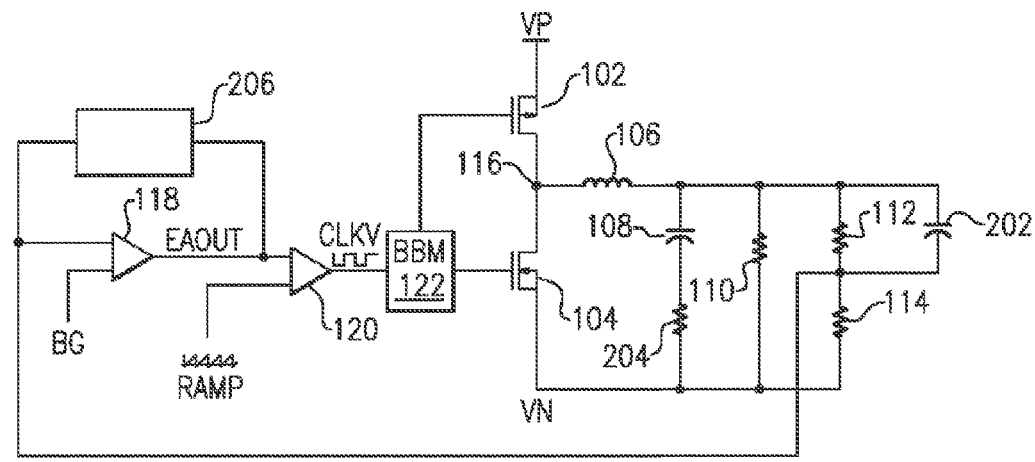
FIG. 2 is a block diagram of a prior art Buck switching regulator with a compensation network.
Figure 3:
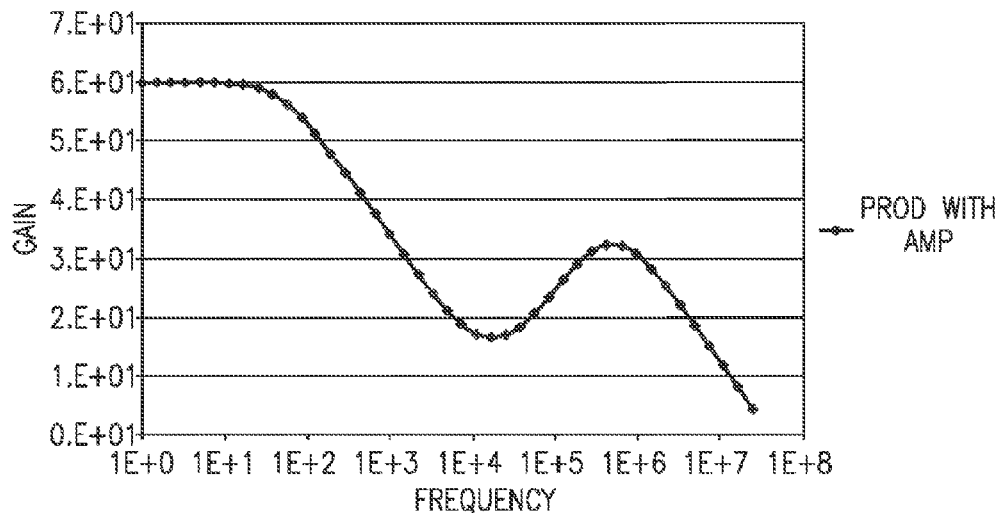
FIG. 3 is a plot showing the gain transfer associated with prior art switching regulators.
Figure 4:
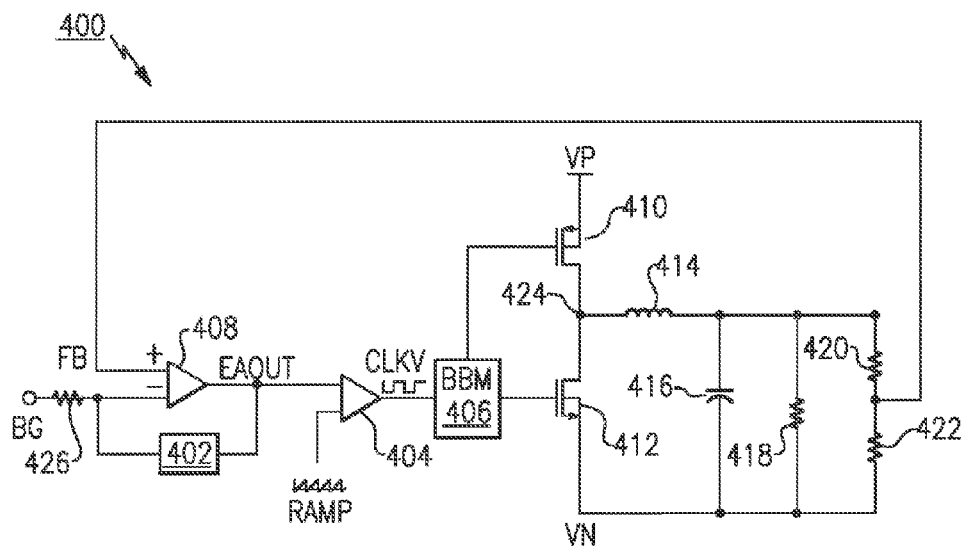
FIG. 4 is a block diagram of an inductor-based switching regulator that includes an embodiment of the compensation network of the present invention.

This disclosure describes an internal compensation network for use in inductor-based switching regulators as well as a related compensation method and inductor-based switching regulators that use the compensation network and method. The compensation network adds a pole and two zeros to compensate high-frequency voltage mode operation. FIG. 4 shows an example of an inductor-based switching regulator 400 that uses an implementation of the compensation network 402. Switching regulator 400 includes a high-side switch 410 connected between an input supply (VP) and a node 424. The node 424 is connected to a ground voltage (VN) by a low-side switch 412. An inductor 414 connects the node 424 to an output node which is further connected to the ground voltage VN by an output capacitor 416. A load 418 is connected between the output node and the ground voltage VN in parallel with the output capacitor 416. A resistive divider formed by resistors 420 and 422 is used to generate a feedback voltage FB that is proportional to the voltage difference between the output node and the ground voltage VN.

The feedback voltage FB is connected to the first input of an error amplifier 408. A second input of the error amplifier 408 is connected, via a resistor 426 to the reference voltage BG. The output of the error amplifier 408 is labeled EAOUT. A compensation network 402 connects the output EAOUT of the error amplifier 408 to a node between the resistor 426 and the error amplifier 408.

The EAOUT voltage is connected an input of a comparator 404. The second input to the comparator 404 is a periodic ramp voltage RAMP. The output of the comparator 404 (i.e., the comparison between the ramp voltage and the output of the error amplifier 408) is a periodic square wave signal CLKV. The square wave signal CLKV is passed to the BBM circuit 406. The BBM circuit 406 generates a signal based on CLKV to drive the high-side switch 410 and a complementary signal to drive the low-side switch 412.

Figure 5:
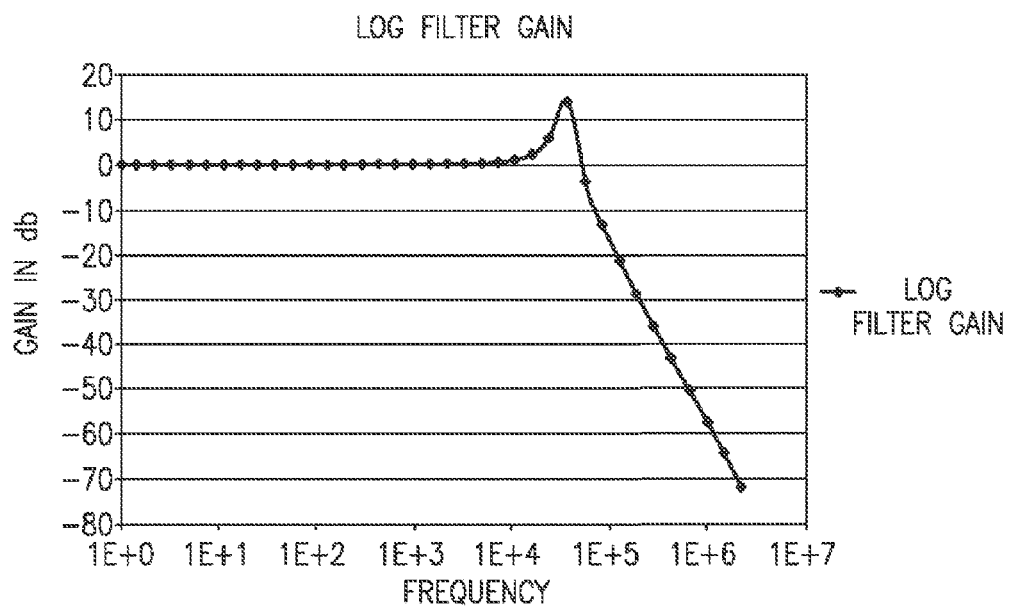
FIG. 5 is a plot showing the LC filter response associated with the switching regulator of FIG. 4.

Stability is a crucial aspect of the Buck converter of FIG. 4. At the heart of the problem is the LC filter response, as shown in FIG. 5 with its double pole at the resonant frequency. It can be seen that it is a double pole roll-off of 40 db per decade starting at the resonant frequency of the filter. This means that there is a 180 degree phase shift in the response curve. If the amplifier had infinite bandwidth, the LC filter phase shift would mean that the system would be very ringy if not unstable. The peak is the result of the poles being near the imaginary axis. A small amount of series resistance, in the switches or the inductor, or losses in the inductor, will keep the peak within reasonable bounds.

Figure 6:
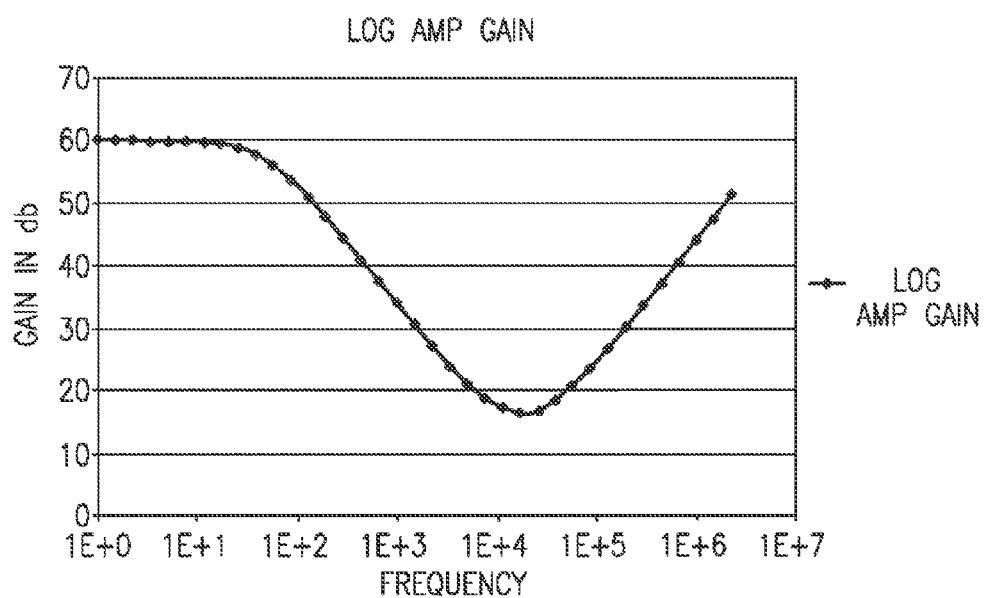
FIG. 6 is a gain plot of the compensation network of FIG. 4.

To compensate this circuit, a dominant pole is introduced to roll off the gain starting at low frequency. Then a first zero is introduced to cancel the effects of the dominant pole. A second zero must be overlaid on the double pole of the LC filter. This will compensate one of the double poles and allow the system to be stable. The gain plot of an amplifier compensation circuit with such a pole and two zeros is shown in FIG. 6.

TABLE 1

| LC Filter Parameters | |
| --- | --- |
| L | 1 uH resonance 35.6 kHz |
| C | 20 uF |
| R | 0.2 ohm |

TABLE 2

| Poles and Zeros of the gain block | |
| --- | --- |
| z1 | 10 kHz |
| z2 | 30 kHz |
| p1 | 0.05 kHz dc gain 1000 |

Figure 7:
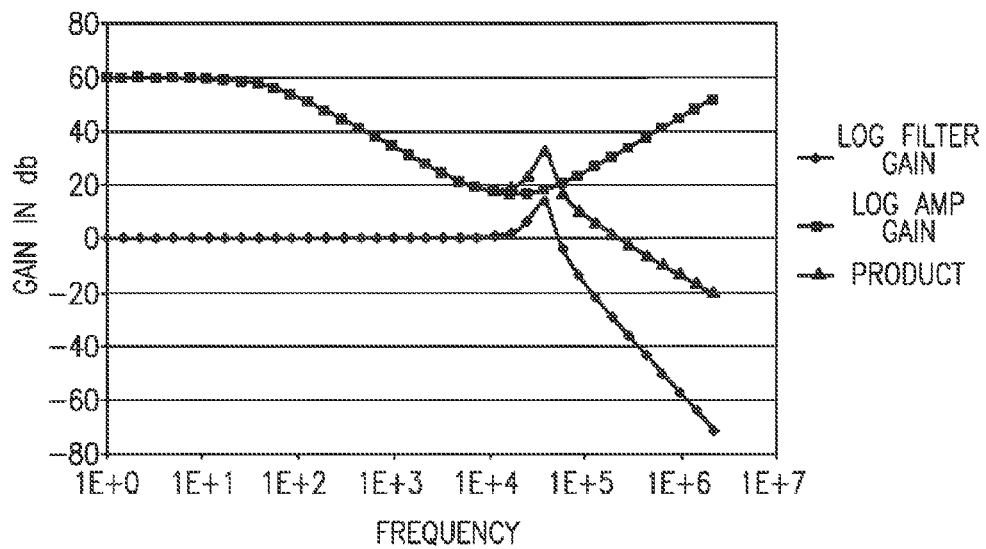
FIG. 7 shows the amplifier gain for the switching regulator of FIG. 4 as well as the associated LC filter gain and the product of the amplifier gain and LC filter gain.

FIG. 7 shows the amplifier gain, the LC filter gain and their product. It can be seen that the system gain has been compensated by the second zero the amplifier. The problem to be solved is how to do this second zero while making the system stable. The line labeled "product" is the resultant. It crosses the zero DB line with 20 db per decade slope showing that the system can be made stable.

Figure 8A:
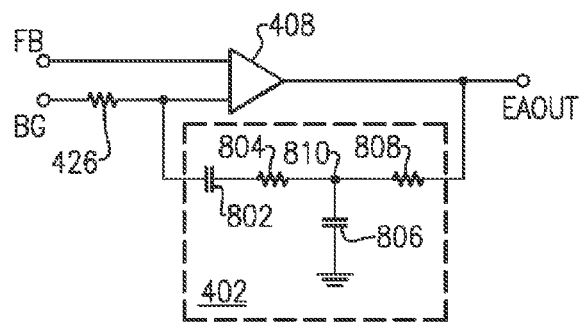
FIG. 8A is a block diagram of a simplified embodiment of the compensation network of the present invention.

To add the dominant pole and two zeros, a simplified version of the compensation network 402 is configured as shown in FIG. 8A. Compensation network 402 includes a capacitor 802, and resistors 804 and 808 connected in series between the second input of the error amplifier 408 and the error amplifier output. A capacitor 806 is connected between the ground voltage VN and a node 810 where the node 810 is between the resistors 804 and 808.

Figure 8B:
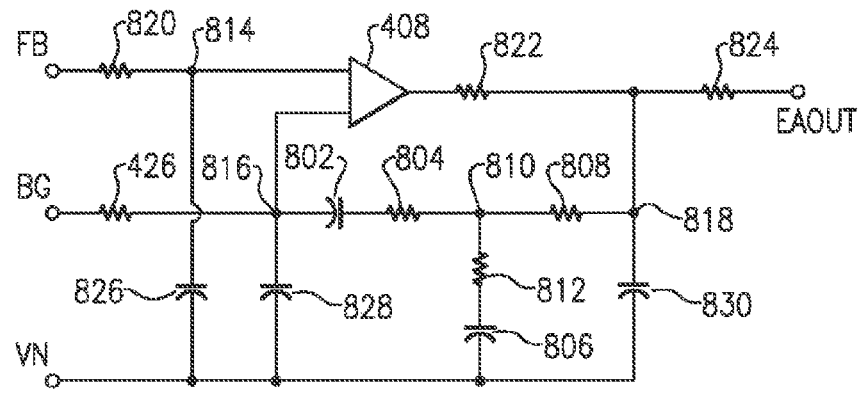
FIG. 8B is a block diagram of an embodiment of the compensation network of the present invention.

As shown in more detail in FIG. 8B, the compensation network is configured to include an error amplifier 408, three filter capacitors (826, 828 and 830), two capacitors (802 and 806), seven resistors 426, 804, 808, 812, 820, 822, 824 and four internal nodes 810, 814, 816, 818. The resistor 820 connects the feedback voltage FB to the internal node 814.

The node 814 is connected, in turn to the error amplifier 408 and via the filter capacitor 826 to the feedback voltage FB to the ground voltage VN. The capacitors 826, 828 and 830 are filter capacitors to filter out the switching frequency of 410 and 412. Likewise, 820, 822 and 824 are the resistors which aid the filter capacitors to work.

The resistor 426 connects a reference voltage BG to the internal node 816. The reference voltage BG is generated using any convenient technique as is well known in the relevant art. The node 816 is connected, in turn to the second input of the error amplifier and via the filter capacitor 828 to the ground voltage VN.

A series connection of the capacitor 802 and the resistor 804 connect the node 816 to the internal node 810. The node 810 is connected, by a series connection of the resistor 812 and the capacitor 806 to the ground voltage VN.

The dominant pole of the amplifier is set by the miller multiplied capacitance of 802 against the resistor 426 in the reference circuit. Typically this might be set at 50 Hz. As the frequency is increased, the impedance of 802 becomes small compared to the resistors. This sets the minimum gain of the amplifier, the AC gain. The AC gain is set by the resistors 426, 804 and 808, which is the sum of the resistance values of resistors 804 and 808 divided by the resistance of resistor 426.

The frequency of the first zero, Z1, is set by resistors 804 and 808 and capacitor 802. It occurs when the sum of the resistance of resistors 804 and 808 is greater than the impedance of capacitor 802. The gain flattens out to the AC gain. As the frequency increases, capacitor 806 starts to be effective, shorting out the feedback signal to ground, so the gain of the amplifier starts to increase through the positive input. At some point, the whole signal is shorted out and the gain of the amplifier approaches the DC gain.

This second zero, Z2, is set by the parallel impedance of resistors 808 and 804 in addition to capacitor 806 which fully determines the compensation network. The feedback signal is uncoupled from the compensation network. Resistor 812 adds a high frequency pole which was added heuristically to improve performance.

Figure 8C:
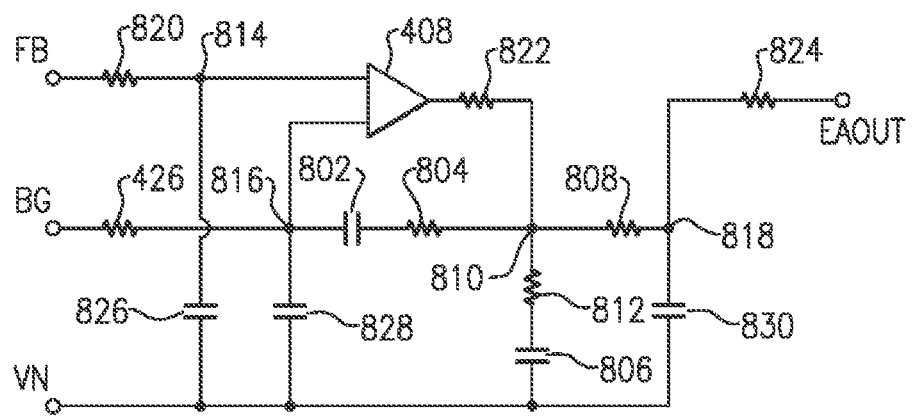
FIG. 8C is a block diagram of an embodiment of the compensation network of the present invention.

In FIG. 8C, a second implementation of the compensation network is shown. Compensation network includes an error amplifier 408, three filter capacitors (826, 828 and 830), two capacitors (802 and 806), seven resistors 426, 804, 808, 812, 820, 822, 824 and four internal nodes 810, 814, 816, 818. The resistor 820 connects the feedback voltage FB to the internal node 814. The node 814 is connected, in turn to the error amplifier 408 and via the filter capacitor 826 to the ground voltage VN. The capacitors 826, 828 and 830 are filter capacitors to filter out the switching frequency of switches 410 and 412. Likewise, 820, 822 and 824 are the resistors which aid the filter capacitors to work.

The resistor 426 connects a reference voltage BG to the internal node 816. The reference voltage BG is generated using any convenient technique as is well known in the relevant art. The node 816 is connected, in turn to the second input of the error amplifier 408 and via the filter capacitor 828 to the ground voltage VN.

A series connection of the capacitor 802 and the resistor 804 connect the node 816 to the internal node 810. The node 810 is connected, by a series connection of the resistor 812 and the capacitor 806 to the ground voltage VN.

A resistor 808 connects the node 810 to the fourth internal node 818. The node 818 is connected by the second filter capacitor 830 to the ground voltage VN. The output of the error amplifier 408 is connected by a resistor 822 to the node 810. The node 818 is connected by a resistor 824 to the output node EAOUT of the compensation network.

It must be noted that the feedback signal comes into the positive input to the error amplifier and that the reference is attached to the negative input. For the loop to operate a 180 degree phase shift is introduced at the comparator in the next stage which inverts the sign of the signals.

In this configuration the signal path is not utilized in the compensation network except as a filter for the switching frequency. All of the signal shaping is done in the feedback path which is not in the direct signal path.

The DC gain is just the DC gain of the amplifier, itself, which can be seen by opening all of the capacitors in the feedback path. The dominant pole of the amplifier is set by the miller multiplied capacitance of 802 against the resistor in the reference circuit, 426. Typically this might be set at 50 Hz. As the frequency is increased, the impedance of 802 becomes small compared to the resistors. This sets the minimum gain of the amplifier, the AC gain. The AC gain is set by the resistors 426, 804 and 808, which is the sum of the resistance values of resistors 804 and 808 divided by the resistance of resistor 426.

The frequency of the first zero, Z1, is set by resistors 804 and 808 and capacitor 802. It occurs when the sum of the resistance of resistors 804 and 808 is greater than the impedance of capacitor 802. The gain flattens out to the AC gain. As the frequency increases, capacitor 806 starts to be effective, shorting out the feedback signal to ground, so the gain of the amplifier starts to increase through the positive input. At some point, the whole signal is shorted out and the gain of the amplifier approaches the DC gain.

This second zero, Z2, is set by the parallel impedance of resistors 804 and 808 in addition to capacitor 806 which fully determines the compensation network. The feedback signal is uncoupled from the compensation network. Resistor 812 adds a high frequency pole which was added heuristically to improve performance.

This circuit has been found to work well because at low frequency the feedback loop is open, no feedback, because of the capacitors being high impedance. At high frequency, the feedback circuit is again open, being shorted out by capacitor 806. If the feedback loop is open, then it can not oscillate. It will be noted that there is no sign of instability of the error amplifier in any simulations whether switching or linearized.

To demonstrate unconditional stability a Bode plot was generated for the local feedback circuit. In order to do this, the loop must be broken. An analysis technique has been developed by Middlebrook to obtain accurate gain and phase response without breaking the loop. It requires two sources be introduced into the feedback loop, a voltage source and a current source. Two transfer ratios are measured from these two cases, Tv and Ti, which are then used to get the total transfer curve, the Bode plot, T as follows:

$$T = \frac{(Ti * Tv - 1)}{(Ti + Tv + 2)}$$

Figure 9:
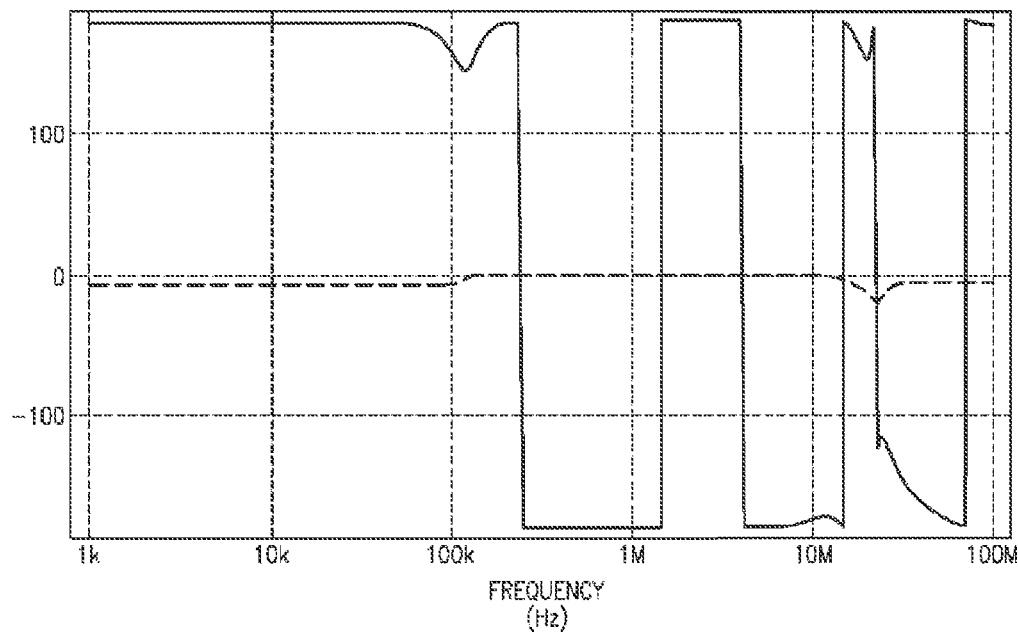
FIG. 9 is a Bode plot that has been generated for the local feedback circuit of the switching regulator of FIG. 4.

The results of this analysis, shown in FIG. 9, are that the local loop compensation circuit and error amplifier combination are unconditionally stable for these circuit elements. The dashed plot is gain in db and the phase is solid line. Aside from the fact that SPICE reflects phase at 180 degrees, it can be seen that the phase hovers around 180 degrees out to 100 Mhz. It can be seen that the gain reaches 1 over a range of frequencies, but the phase is always 180 degrees, or close, while the gain is near unity. There is only a small observation, that at 20 Mhz, there is a small disturbance in the phase, but the gain has dropped below unity at this point.

This analysis confirms the observation that the transient simulation makes, that this circuit is very stable and exhibits no tendency to oscillate.

What is claimed is:

1. A method for operating a switching regulator, the switching regulator including a high-side switch connected between an input voltage and a first node, a low-side switch connected between the first node and a ground, and an inductor connected between the first node and an output node, the method comprising:
   driving the high and low-side switches in a repeating sequence including activating the high-side switch to connect the first node to the input voltage in an inductor charging phase and activating the low-side switch to connect the first node to the ground in an inductor discharging phase;
   generating a feedback voltage proportional to an output voltage of the switching regulator;
   generating a voltage proportional to the duty-cycle of the inductor charging and discharging phases as a function of a difference between the feedback voltage and a reference voltage; and adding a dominate pole and two zeros to the function used to generate the voltage proportional to a duty-cycle of the inductor charging and discharging phases, by using a compensation network connected between a negative input and an output of an error amplifier but not being connected to the feedback voltage, the negative input of the error amplifier being connected to the reference voltage, the compensation network including
      a first capacitor and a first resistor connected in series between the negative input of the error amplifier and a second node,
      a second resistor connected between the second node and the output of the error amplifier, and
      a second capacitor connected between the second node and the ground.

2. The method of claim 1 wherein the compensation network further includes a third resistor connected between the second node and the second capacitor and a third capacitor connected between the negative input of the error amplifier and the ground, the third resistor and the third capacitor compensating for the non-ideal nature of the error amplifier.

3. The method of claim 2 wherein the compensation network further includes
   a fourth resistor connected between the feedback voltage and the error amplifier,
   a fourth capacitor connected in series between a third node and the ground, the third node being located between the fourth resistor and the error amplifier,
   a fifth resistor and a sixth resistor connected at the output of the error amplifier, and
   a fifth capacitor connected between a fourth node and the ground, the fourth node being located between the fifth resistor and the sixth resistor, the fourth resistor, the fifth resistor, the sixth resistor, the fourth capacitor, and the fifth capacitor acting to filter out a switching frequency of the switching regulator.

4. A circuit for controlling a switching regulator, the switching regulator including a high-side switch connected between an input voltage and a first node, a low-side switch connected between the first node and a ground, and an inductor connected between the first node and an output node, the circuit comprising:
   a control circuit for driving the high and low-side switches in a repeating sequence that includes activating the high-side switch to connect to the first node to the input voltage in an inductor charging phase and activating the low-side switch to connect the first node to the ground in an inductor discharging phase;
   a resistor divider for generating a feedback voltage that is proportional to an output voltage of the switching regulator;
   an error amplifier for generating a voltage proportional to a duty-cycle of the inductor charging and discharging phases as a function of a difference between the feedback voltage and a reference voltage, a negative input of the error amplifier being connected to the reference voltage; and
   a compensation network for adding a dominate pole and two zeros to an output of the error amplifier, the compensation network being connected between the negative input and the output of the error amplifier but not being connected to the feedback voltage, the compensation network including
      a first capacitor and a first resistor connected in series between the negative input of the error amplifier and a second node,
      a second resistor connected between the second node and the output of the error amplifier, and
      a second capacitor connected between the second node and the ground.

5. The circuit of claim 4 wherein the compensation network further includes a third resistor connected between the second node and the second capacitor.

6. The circuit of claim 5 wherein the compensation network further includes a fourth resistor connected between the feedback voltage and the error amplifier.

7. The circuit of claim 6 further comprising a third capacitor connected between the negative input of the error amplifier and the ground, the third resistor and the third capacitor compensating for a non-ideal nature of the error amplifier.

8. The circuit of claim 7 further comprising a fourth capacitor connected in series between a third node and the ground, the third node being located between the fourth resistor and the error amplifier.

9. The circuit of claim 8 further comprising a fifth resistor and a sixth resistor connected at the output of the error amplifier.

10. The circuit of claim 9 further comprising a fifth capacitor connected between a fourth node and the ground, the fourth node being located between the fifth resistor and the sixth resistor, the fourth resistor, the fifth resistor, the sixth resistor, the fourth capacitor and the fifth capacitor acting to filter out a switching frequency of the switching regulator.

11. A method for operating a switching regulator, the switching regulator including an inductor connected between an input voltage and a first node, a high-side switch connected between the first node and an output node, and a low-side switch connected between the first node and a ground, the method comprising:
   driving the high and low-side switches in a repeating sequence including activating the low-side switch to connect the first node to the ground in an inductor charging phase and activating the high-side switch to connect the first node to the output node in an inductor discharging phase;
   generating a feedback voltage that is proportional to an output voltage of the switching regulator;

generating a voltage proportional to a duty-cycle of the inductor charging and discharging phases as a function of a difference between the feedback voltage and a reference voltage; and adding a dominate pole and two zeros to the function used to generate the voltage proportional to the duty-cycle of the inductor charging and discharging phases by using a compensation network connected between a negative input and an output of an error amplifier but not being connected to the feedback voltage, the negative input of the error amplifier being connected to the reference voltage, the compensation network including a first capacitor and a first resistor connected in series between the negative input of the error amplifier and a second node, a second resistor connected between the second node and the output of the error amplifier, and a second capacitor connected between the second node and the ground.

12. The method of claim 11 wherein the compensation network further includes a third resistor connected between the second node and the second capacitor, and a third capacitor connected between the negative input of the error amplifier and the ground, the third resistor and the third capacitor compensating for a non-ideal nature of the error amplifier.

13. The method of claim 12 wherein the compensation network further includes a fourth resistor connected between the feedback voltage and the error amplifier, a fourth capacitor connected in series between a third node and the ground, the third node being located between the fourth resistor and the error amplifier, a fifth resistor and a sixth resistor connected at the output of the error amplifier, and a fifth capacitor connected between a fourth node and the ground, the fourth node being located between the fifth resistor and the sixth resistor, the fourth resistor, the fifth resistor, the sixth resistor, the fourth capacitor, and the fifth capacitor acting to filter out a switching frequency of the switching regulator.

14. A circuit for controlling a switching regulator, the switching regulator including an inductor connected between an input voltage and a first node, a high-side switch connected between the first node and an output node, and a low-side switch connected between the first node and a ground, the circuit comprising:

a control circuit for driving the high and low-side switches in a repeating sequence including activating the low-side switch to connect the first node to the ground in an inductor charging phase and activating the high-side switch to connect the first node to the output node in an inductor discharging phase;

a resistor divider for generating a feedback voltage that is proportional to an output voltage of the switching regulator;

an error amplifier for generating a voltage proportional to a duty-cycle of the inductor charging and discharging phases as a function of a difference between the feedback voltage and a reference voltage, a negative input of the error amplifier being connected to the reference voltage; and a compensation network for adding a dominate pole and two zeros to an output of the error amplifier, the compensation network being connected between the negative input and the output of the error amplifier but not being connected to the feedback voltage, the compensation network including a first capacitor and a first resistor connected in series between the negative input of the error amplifier and a second node, a second resistor connected between the second node and the output of the error amplifier, and a second capacitor connected between the second node and the ground.

15. The circuit of claim 14 wherein the compensation network further includes a third resistor connected between the second node and the second capacitor.

16. The circuit of claim 15 wherein the compensation network further includes a fourth resistor connected between the feedback voltage and the error amplifier.

17. The circuit of claim 16 further comprising a third capacitor connected between the negative input of the error amplifier and the ground, the third resistor and the third capacitor compensating for a non-ideal nature of the error amplifier.

18. The circuit of claim 17 further comprising a fourth capacitor connected in series between a third node and the ground, the third node being located between the fourth resistor and the error amplifier.

19. The circuit of claim 18 further comprising a fifth resistor and a sixth resistor connected at the output of the error amplifier.

20. The circuit of claim 19 further comprising a fifth capacitor connected between a fourth node and the ground, the fourth node being located between the fifth resistor and the sixth resistor, the fourth resistor, the fifth resistor, the sixth resistor, the fourth capacitor and the fifth capacitor acting to filter out a switching frequency of the switching regulator.

\* \* \* \* \*